(No Model.) 3 Sheets—Sheet 3.
J. R. McCORD.
MACHINE FOR DISTRIBUTING FERTILIZERS.
No. 377,166. Patented Jan. 31, 1888.
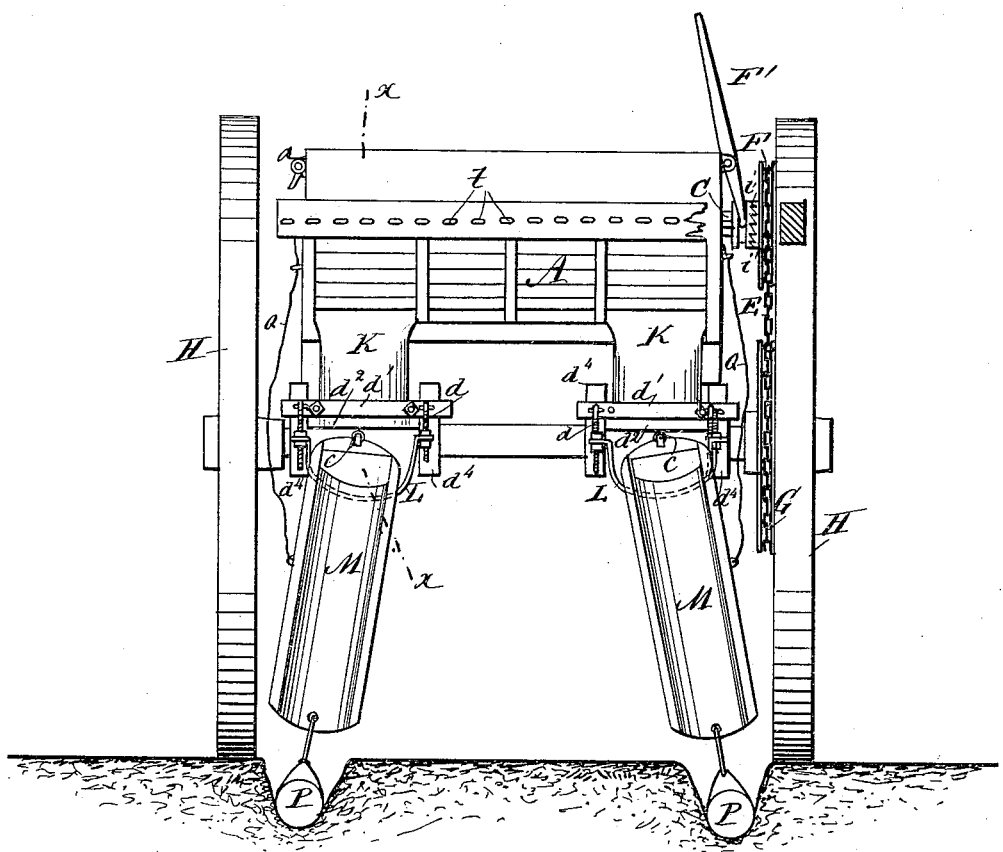
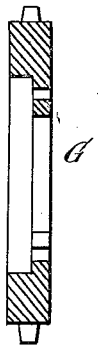
WITNESSES:
INVENTOR:
BY
ATTORNEYS.

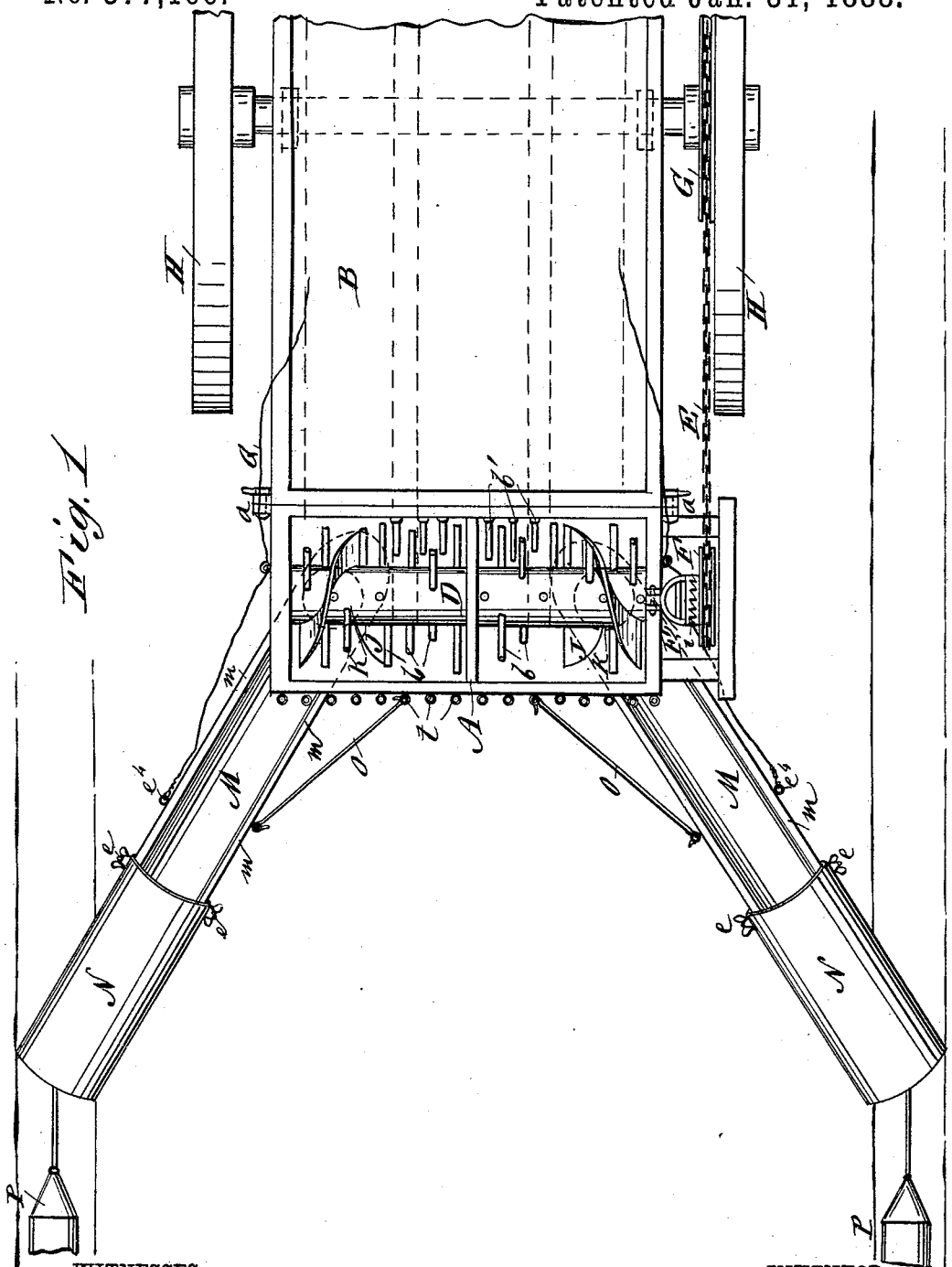

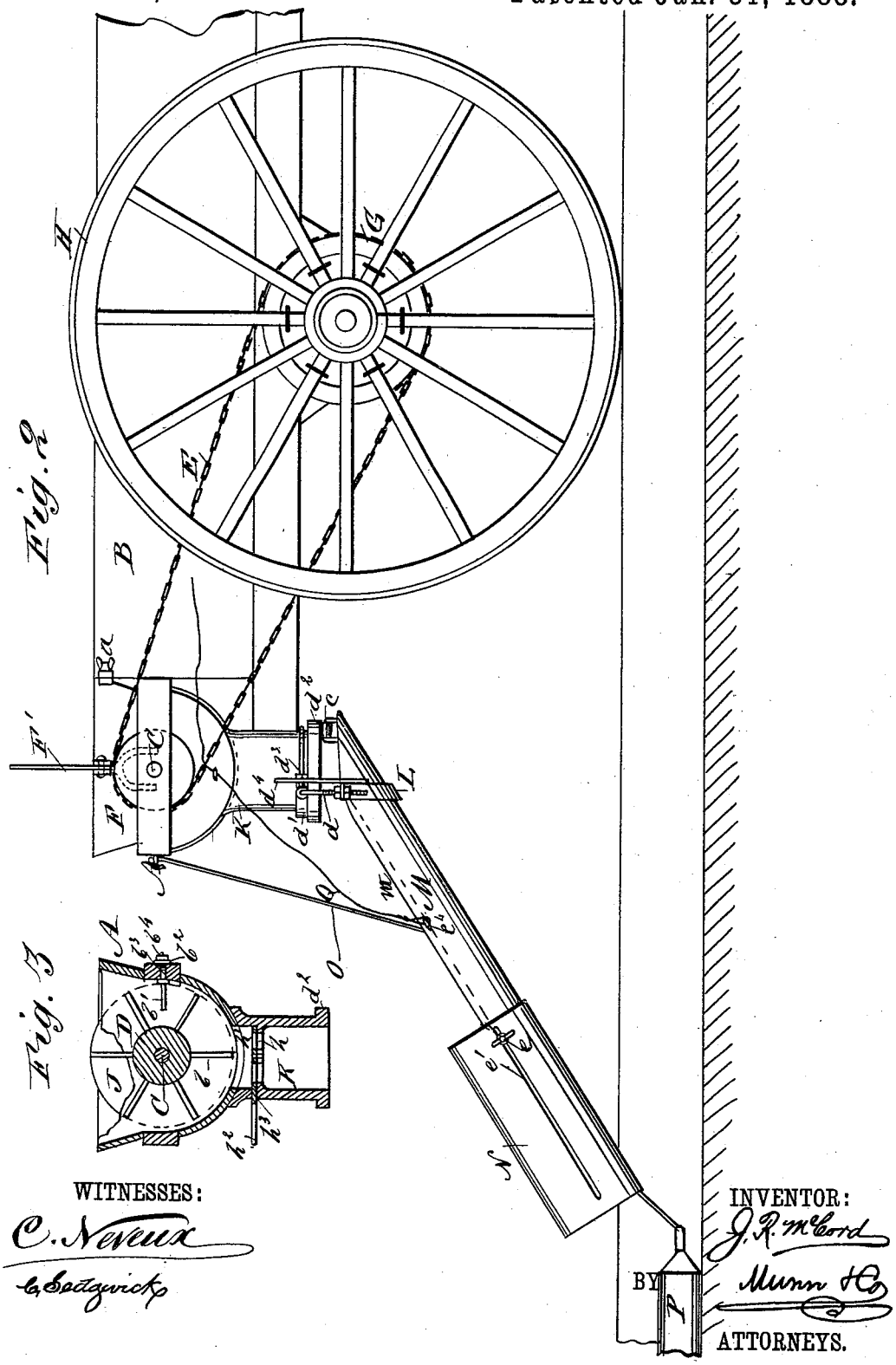

UNITED STATES PATENT OFFICE.

JAMES R. McCORD, OF JACKSON, GEORGIA.

MACHINE FOR DISTRIBUTING FERTILIZERS.

SPECIFICATION forming part of Letters Patent No. 377,166, dated January 31, 1888.

Application filed August 8, 1887. Serial No. 246,429. (No model.)

*To all whom it may concern:*

Be it known that I, JAMES RUFUS MCCORD, of Jackson, in the county of Butts and State of Georgia, have invented a new and Improved Machine for Distributing Fertilizers, &c., of which the following is a full, clear, and exact description.

The object of my invention is to provide a practical machine for distributing compost, fertilizers, and manures of all kinds, wet or dry, in rows or furrows, and directly from a wagon; and the invention consists of a machine constructed substantially as hereinafter described and claimed, the same being adapted to distribute to two rows at the same time, and to be adjusted to rows of greater or less distance apart, and to automatically follow irregular rows, or rows that are not exactly parallel.

Reference is to be had to the accompanying drawings, forming a part of this specification, in which similar letters of reference indicate corresponding parts in all the figures.

Figure 1 is a plan view of the distributer as it appears attached to the rear end of a wagon and arranged for distributing in wide rows. Fig. 2 is a side elevation of the same. Fig. 3 is a sectional elevation on line $x$ $x$ of Fig. 4. Fig. 4 is an end elevation of the distributer arranged for narrow rows, and Fig. 5 is a detached sectional view of the drive-gear attached to one of the wheels of the wagon.

A represents a hopper or trough attached by bolts $a$ $a$ or other suitable means to the rear end of the wagon-box B. In the end walls of the hopper A is journaled the shaft C, on which is placed the cylinder or drum D. The said shaft and drum are revolved by the chain belt E, passing over the chain pulley F, attached to the shaft C, and the drive-pulley G, attached to one of the wheels H of the wagon.

In the drum D are secured the series of spirally-arranged mixing and conveying fingers $b$, and at each end, but within the hopper, the drum is provided, also, with the spiral conveyers J; but these may be omitted, if desired, as they are needed only in distributing wet fertilizers for conveying the same to the outlets K, which are formed at the bottom and near the ends of the hopper.

Beneath each outlet K is held by a suitable hanger or stirrup, L, a spout, M, for conducting the material to the furrows in the ground, as will be understood from Fig. 4. The stirrups L are made vertically adjustable by the bolts $d$ and nuts thereon, so that the pitch or slant of the spouts M (and also pipes N, to be hereinafter described) may be increased or diminished, as desired. The bolts $d$ pass through lugs projecting from the curved cross-pieces $d'$, held upon the flange $d^2$ of the outlets K by the bails or wires $d^3$, and from these cross-pieces depend the arms or plates $d^4$, to prevent the yokes L from swinging out of place. The cross-pieces $d'$ turn freely upon the collars $d^2$, so that the spouts M N may accommodate themselves to irregularities in the furrows, and anti-friction rollers $c$ are fitted at the upper ends of the spouts M, to avoid unnecessary friction of the spouts against the lower surface of the outlets K.

The tubes N serve as extensions to the spouts M for distributing in wide rows, as illustrated in Fig. 1, and said tubes are automatically adjustable longitudinally upon the spouts M, so that the fertilizer may be deposited at different distances from the wagon, according to the distance between the furrows, being in this instance attached to the spouts by bolts $e$, working in slots $e'$. For staying the spouts M, and through them the tubes N when used, I employ the stay-rods O, connected to the spouts M and the hopper A, as shown in Figs. 1 and 2, the rods being hooked to the spouts at the lower ends and to eyes $t$, attached to the hopper A. There will be a series of eyes, $t$, for adjusting the stay-rods to and fro, so as to cause them to spread the spouts M more or less, according to the distance the rows are apart. In distributing in furrows only a short distance apart the stay-rods O need not be used.

In order to cause the spouts M to follow the furrow, I employ the weights P, attached to the spouts or tubes M or N, as the case may be, and which drag in the furrows, and thus act as governors for the pipes N, causing them to swing to and fro, answering to any short curves or irregularities in the furrows.

For lifting the pipes M N from the ground, I provide the machine with the cords Q, which are attached to the eyes $e^4$ and reach to the wagon-body, as illustrated in Fig. 2.

In connection with the fingers $b$ in the drum D, I may use the stationary fingers $b'$ in the hopper, so that the fertilizer will be thoroughly pulverized by the action of the said fingers. The fingers $b'$ are each formed with a collar, $b^2$, and screw-threaded shank $b^3$, to receive the nut $b^4$, so that by removing the nut the finger may be easily removed from the hopper and replaced at pleasure, as will be understood from Fig. 3.

The gear-wheel F is of course loose upon the shaft O, and it is formed with the clutch $i$, with which the sliding clutch $i'$ is adapted to engage for putting the machine in and out of gear. The sliding clutch $i'$ is operated by the lever F', so that the machine may be conveniently put in and out of gear. (See Fig. 4.) In each outlet K is formed or placed an apertured diaphragm, $h$, through which the material is fed, and upon this is pivoted a disk, $h'$, with openings to correspond with those of the diaphragm $h$, and the said plate is formed or provided with a handle, $h^2$, which reaches through a slot, $h^3$, in the outlet K, for adjusting the plate $h'$ to regulate the discharge of material from the hopper. The edges of the spouts M are strengthened with wire or small iron rods, over which the material of the spouts is rolled, as shown at $m\ m$, Fig. 1, to stiffen and strengthen the spouts.

By employing the loose and self-adjusting extension-tubes N the difficulty arising from the rows not being exactly parallel is entirely overcome, as the tubes will swing somewhat and move up and down upon spouts N as the irregularities occur, and thus always cause the material to be uniformly distributed at the bottom of the furrows.

Having thus described my invention, what I claim as new, and desire to secure by Letters Patent, is—

1. The combination, with the hopper A and outlets K thereof, of the spouts M and the weights P, attached to the lower ends of the spouts to run in the furrows, substantially as and for the purpose set forth.

2. The combination, with the hopper A and the outlets K thereof, of the spouts M, connected to the outlets by a rotating connection, and the weights P, to run in the furrows, substantially as described.

3. The hopper A, provided with the outlets K, in combination with the spouts M, suspended below the outlets by a rotating connection, and the pipes N, attached to the lower ends of the spouts M, substantially as described.

4. The hopper A and the outlets K thereof, and the spouts M, connected to the outlets by a rotating connection, in combination with the pipes N, attached to the lower ends of the spouts M by slots $e'$ and bolts $e$, whereby the pipes N are adapted to automatically slide endwise upon the spouts M, substantially as described.

5. The hopper A, formed with the outlets K, in combination with the spouts M, pipes N, and weights P, substantially as described.

6. The spouts M, suspended from the outlets of the hopper, in combination with the adjustable brace-rods O and the tubes N, adjustably attached to the spouts M, substantially as described.

JAMES R. McCORD.

Witnesses:
J. G. THOMPSON,
R. C. MANLEY.